C. S. H. SNOW.
NUT LOCK.
APPLICATION FILED JUNE 14, 1920.
1,376,296.                                  Patented Apr. 26, 1921.
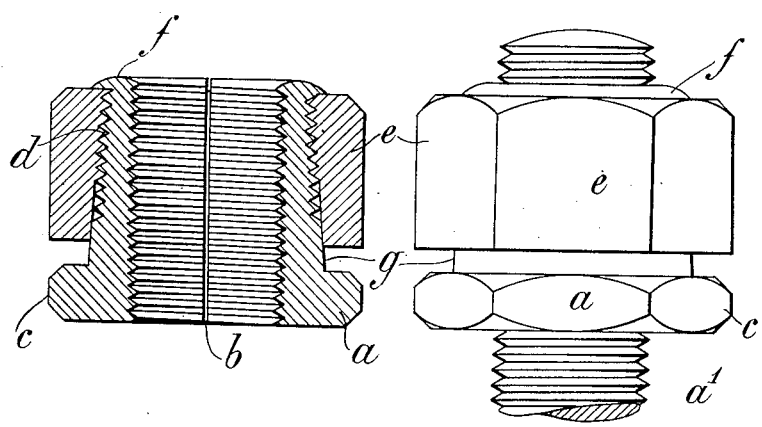
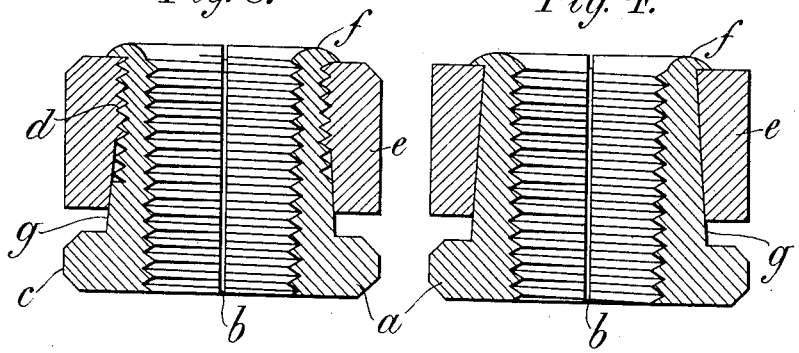
Inventor
C. S. H. Snow
by
Atty

UNITED STATES PATENT OFFICE.

CHARLES STEWART HASTINGS SNOW, OF HAMPSTEAD, LONDON, ENGLAND.

NUT-LOCK.

1,376,296.  Specification of Letters Patent.  Patented Apr. 26, 1921.

Application filed June 14, 1920. Serial No. 388,885.

*To all whom it may concern:*

Be it known that I, CHARLES STEWART HASTINGS SNOW, a subject of His Majesty the King of England, and resident of Hampstead, in the county of London, Kingdom of England, have invented certain new and useful Improvements in Nut-Locks, of which the following is a specification.

This invention relates to improvements in nut locks and it has for its primary object to provide a device of simple and effective construction in which the parts are not liable to become detached when loose.

According to this invention the improved nut lock comprises two parts a main split sleeve or bush which is internally screwed to engage the bolt or stud and an outer clamping nut or ring coöperating with a tapering or conical surface on the main sleeve or bush.

In order that the invention may be clearly understood and more readily carried into effect it is hereinafter described with reference to the accompanying drawings, in which:—

Figure 1 is a sectional side elevation of a nut lock construction according to this invention;

Fig. 2 is an outside elevation of said nut lock on a bolt or stud;

Figs. 3 and 4 are sectional side elevations of two modified constructions hereinafter described.

As shown and referring generally to the drawings the main sleeve $a$ is internally screw-threaded to fit the bolt or stud $a'$ and is divided longitudinally on one side as by a saw cut $b$. At its lower or inner end it is formed with a hexagon or other shaped engagement surface $c$ and above this it is suitably reduced in diameter and formed with a tapering and screw threaded surface $d$. Rotatably arranged around the said split sleeve $a$ is a hexagonal or other suitably formed clamping ring $e$ which is internally screw threaded to engage the external threads on the split sleeve or bush $a$. Thus the tightening up of the clamping ring $e$ will contract the split sleeve or bush $a$ constituting the nut proper on to its bolt or stud, giving a uniform grip over the whole length of the thread of the nut which therefore cannot spread at the mouth.

In order to prevent detachment of the parts before use or when they are loose the outer edge $f$ of the inner member $a$ is slightly spun or burred over in an outward direction thus preventing the complete disengagement of the clamping nut or ring $e$ from the split sleeve or bush $a$ forming the nut.

If desired the clamping or locking effect may be wholly produced by a tapering screw threaded surface on the inside of the clamping nut or ring $e$ engaging a similar external surface $d$ on the plit nut $a$ as in Fig. 1 or these parts may be in parallel screw engagement with each other as in Fig. 3 and have conical surfaces $g$ formed thereon to produce the said locking effect. In some cases this locking effect may be obtained by dispensing with the screwed engagement surfaces and by making the taper surfaces $g$ of such pitch that the member $e$ can be tapped into position and held in its adjusted position by friction, as will be readily understood by reference to Fig. 4 of the drawings.

It will be seen that the main split sleeve is the only member in engagement with the nut or bolt and that therefore it is impossible for the screw threads to become damaged or distorted by the use of the nut lock. Also by the arrangement of the outer clamping nut or ring on a reduced portion of the nut enables an arrangement to be provided in which both hexagon surfaces are of the same size and can therefore be operated by means of a single spanner.

What I claim is:—

A nut lock comprising a main split sleeve having the external surface tapering with that portion of such surface of greatest diameter plain and that portion of such surface of least diameter threaded in combination with an outer clamping nut having an interior bore corresponding to the exterior surface of the main sleeve and having a plain portion of the sleeve and a threaded portion to coöperate with the threaded portion of the sleeve, both the threaded and plain portions of the clamping nut exerting a clamping action on the main sleeve in the movement of the nut longitudinally of the sleeve.

In testimony whereof I have hereunto signed my name.

CHARLES STEWART HASTINGS SNOW.